Dec. 29, 1959  D. A. GOLDMAN  2,919,065
INTEGRATOR
Filed Aug. 24, 1956

Inventor
DAVID A. GOLDMAN

United States Patent Office 2,919,065
Patented Dec. 29, 1959

2,919,065
INTEGRATOR

David A. Goldman, Yorktown Heights, N.Y.

Application August 24, 1956, Serial No. 606,174

6 Claims. (Cl. 235—183)

(Granted under Title 35, U.S. Code (1952), sec. 266)

The invention described herein may be manufactured and used by or for the Government of the United States of America for governmental purposes without the payment of any royalties thereon or therefor.

The present invention relates to an integrator which provides a shaft displacement which is the integral of a varying input voltage. Prior devices for providing a signal that is the integral of a varying voltage: ball disk integrators, comparator-motor integrators, etc., have disadvantages due to the fact that they are inaccurate over wide environmental conditions and have a low dynamic range. In the present invention a first shaft, connected to the control element of a variable voltage source, is driven until the voltage from the source is equal to the input varying voltage. Then the driving means for this first shaft is disconnected and a second shaft is driven which acts upon the same voltage source to reduce the voltage produced by the source to zero. The driving source for this shaft is disconnected and then the whole process is repeated. Each single shaft movement is a function of the instantaneous magnitude of the input voltage since one shaft is rotated an amount corresponding to a change in voltage from zero to the input voltage and the other shaft is rotated until there is a change of voltage from the input voltage value down to zero. The driving means for both shafts are operated alternately at a rate which is much higher than the changes in the input voltage. Since the total displacement of each shaft during a given time is equal to the sum of the individual shaft displacements, each individual displacement of which is a function of the instantaneous magnitude of input voltage, the total displacement of either shaft is a function of the integral of the input voltage. The inherent characteristics of the present invention render it insensitive to temperature changes, amplifier gains, and also give it a wide dynamic reach.

Accordingly, an object of the present invention is the provision of an integrator which provides an output shaft displacement that is proportional to the integral of an input varying voltage.

Another object is to provide an integrator for providing an indication of the integral of an input varying voltage.

A further object of the present invention is the provision of an integrator that has a wide dynamic range and is relatively insensitive to temperature changes and changes in amplifier gain.

Other objects and many of the attendant advantages of this invention will be readily appreciated as the same becomes better understood by reference to the following detailed description when considered in connection with the accompanying drawings wherein.

Figure 1:
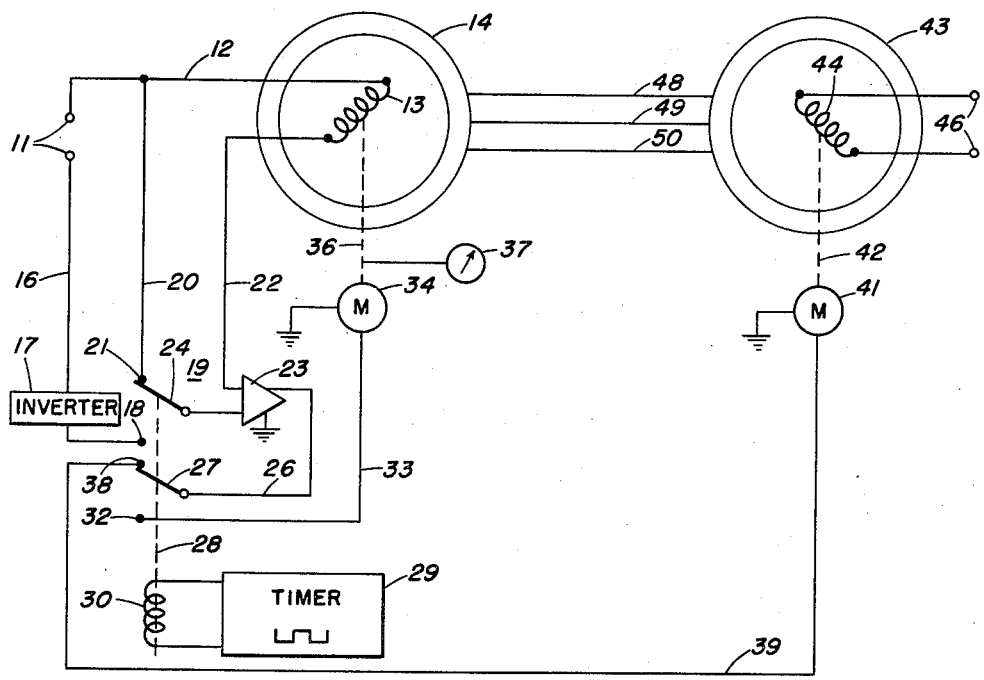
Fig. 1 shows a block diagram of a preferred embodiment of the invention.

Referring now to the drawings wherein like reference characters designate like or corresponding parts throughout the several figures, there is shown in Fig. 1 (which illustrates a preferred embodiment) input terminals 11 which are applied to the varying voltage that is to be integrated. Lead 12 joins one of the input terminals 11 to one end of the rotor winding 13 of synchro control receiver 14 which has stationary windings that are not shown. The other input terminal is joined by lead 16 to inverter 17 which has its output joined to contact 18 of double-pole double-throw switch 19. Lead 20 interconnects contact 21 with lead 12. The other end of rotor winding 13 is joined by lead 22 to one input of amplifier 23 and the other input to amplifier 23 comes from arm 24 of switch 19. One output of amplifier 23 is grounded and the other is joined by lead 26 to arm 27 of switch 19. The arms 24 and 27 of switch 19 are joined by shaft 28 which alternately moves backward and forward by means of the operation of timer 29 energizing coil 30. The movement of shaft 28 from one position to the other is quite rapid and it stays in both positions an equal length of time. Contact 32 of switch 19 is joined by lead 33 to one input of motor 34, which has another input connected to ground. The output of motor 34 drives a shaft 36 which is connected to the rotor of receiver 14. Indicator 37 is mounted to provide an indication of the angular displacement of shaft 36. Contact 38 of switch 19 is joined by lead 39 to an input of motor 41, the other input which is a ground connection. The output of motor 41 is joined by shaft 42 to the rotor of synchro control transmitter 43 which has a rotor winding 44 which is connected to be energized by a source of A.C. voltage applied at terminals 46. Transmitter 43 like receiver 14 has stationary windings that are not shown and these windings are joined by leads 48, 49, and 50 to the stationary windings of synchro control receiver 14. The elements of the Fig. 1 embodiment are conventional and well known in the art with perhaps the exception of inverter 17. Inverter 17 inverts the varying input voltage applied to terminals 11 into an A.C. voltage having the same frequency and phase as the A.C. voltage applied to terminals 46 and in addition is polarity responsive; that is, if the voltage applied to terminals 11 is negative the output of inverter 17 is phase shifted one hundred and eighty degrees.

Figure 2:
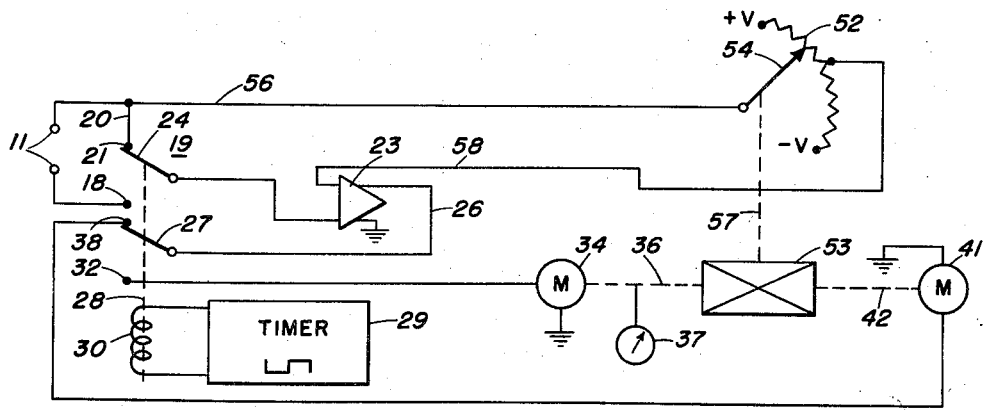
Fig. 2 illustrates another embodiment of the invention.

The main changes in the Fig. 2 embodiment as compared to the Fig. 1 embodiment concern the potentiometer 52 and the differential 53. Arm 54 of potentiometer 52 is joined by a lead 56 to one input terminal 11. This arm also has a mechanical connection by means of shaft 57 to the output of differential 53. The two inputs of differential 53 are shafts 36 and 42. A positive and negative voltage is applied to the ends of the potentiometer winding of potentiometer 52, and a lead 58 joins the zero potential point of this winding to one input to amplifier 23. The other components of the Fig. 2 embodiment have numbers the same as components of the Fig. 1 embodiment, and function identically as their corresponding components.

Referring now to the operation of the Fig. 1 embodiment: Assuming that switch arms 24 and 27 are initially in the position shown in Fig. 1, motor 41 rotates the rotor of transmitter 43 until the winding 44 is in a position such that there is no voltage induced in rotor winding 13 of receiver 14. This result is obtained from the feeding of the voltage generated in the winding 13 through switch arm 24 to amplifier 23 and through switch arm 27 to motor 41 and thus motor 41 is energized to produce rotation until there is no output from rotor winding 13. After a period of time determined by the inherent characteristics of timer 29, shaft 28 of switch 19 is moved to its other position in which arm 24 contacts contact 18 and arm 27 joins contact 32. Amplifier 23 is then fed by the difference in the voltages generated by winding 13 and applied at input terminals 11. Since there is no counteracting voltage initially being generated in armature 13, there is an output from amplifier 23 that is fed through arm 27, and lead 33 to motor 34 which rotates the rotor of receiver 14 until motor 34 is no longer energized, at which time the two inputs to amplifier 23 must be exactly equal so that their difference is zero. Thus, the voltage then generated in armature 13 is equal to the voltage applied at the input of terminals 11. After a time determined by timer 29, shaft 28 is moved back again to the first position wherein arm 24 contacts terminal 21 and arm 27 contacts terminal 38. Then motor 41 is again energized by the output of winding 13 which initially is equal to the voltage applied at terminals 11. Motor 41 rotates shaft 42 until the rotor winding 44 is displaced such that the voltage generated in winding 13 is again zero. Then after a time, shaft 28 is again moved and amplifier 23 is energized by the difference in inputs from input terminals 11 and winding 13, and the whole process is repeated. It is thus seen that the shaft 36 is rotated proportionally to the amplitude of the input voltage applied at terminals 11 because initially the voltage generated in winding 13 is zero and shaft 36 is rotated each time motor 34 is energized until the output from winding 13 is equal to the input voltage. Thus each movement of shaft 36 is a function of the magnitude of the input voltage and the total displacement of shaft 36 as indicated by meter 37 over a period of time is a function of the integral of the applied voltage. Of course this shaft displacement is not exactly equal to the integral of the voltage applied at terminals 11 because the integration is taken in finite steps the time duration of each of which is determined by the operation of timer 29. But if the frequency of the operation of timer 29 is very much greater than the changes in the frequency of the changes in the voltage applied at terminals 11, the shaft displacement of shaft 36 is quite close to the actual integral of the input voltage. Meter 37 could be mounted on shaft 42 as well because shaft 42 is displaced through the same angle as shaft 36. This is apparent when it is realized that shaft 36 rotates winding 13 to a position such that the voltage generated in this winding varies from zero volts to the voltage applied at terminals 11 and shaft 42 changes the position of winding 44 such that the voltage generated in winding 13 changes from this input applied voltage value to zero volts. Since in a synchro unit it takes just as much rotation to go from zero volts to a certain number of volts as it does to go from that certain number of volts back to zero, the shaft rotations of shafts 36 and 42 must be identical.

The embodiment disclosed in Fig. 2 works in a similar fashion, except that a potentiometer 52 and differential 53 are employed in lieu of synchro units. In Fig. 2, assuming that the position of arms 24 and 27 of switch 19 are as shown, motor 41 rotates shaft 42 which in turn rotates shaft 57 and arm 54 on potentiometer 52 until arm 54 rests on the point at which lead 58 is connected to potentiometer 52. Then, the input to amplifier 23 is zero and there is no energizing voltage for motor 41. After a time ΔT determined by timer 29, shaft 28 is moved such that arm 24 contacts contact 18 and arm 27 is joined to contact 32. Then amplifier 23 is fed by the difference in voltage applied to input terminals 11 and that obtained from potentiometer 52 through lead 58. Since initially the voltage applied from potentiometer 52 is zero, the total input voltage at terminals 11 is applied to amplifier 23 to energize motor 34 to rotate shafts 36 and 57 to move arm 54 until the output from potentiometer 52 is equal to the voltage applied at terminals 11. After a time ΔT, shaft 28 is moved such that arm 24 contacts contact 21 and arm 27 joins contact 38. At this time the voltage from the potentiometer 52 is applied to amplifier 23 which feeds motor 41 and thus motor 41 acting through shaft 42 and differential 53 rotates shaft 57 and arm 54 of potentiometer 52 until the voltage applied to amplifier 23 is zero. Then the process is repeated for the desired length of time over which the input voltage applied at terminals 11 is to be integrated. As in the Fig. 1 embodiment, indicator 37 indicates the total displacement of shaft 34 which is proportional to the integral of the variable voltage applied at input terminals 11.

Two embodiments of the present invention are disclosed and in each, the integral of an input varying voltage is obtained by means of an indication of a total shaft displacement over a selected period of time. In a first embodiment, synchro units are employed in two feedback loops to cause one shaft to be moved to rotate a synchro winding such that the voltage generated at this winding is equal to the input voltage and to cause another shaft to rotate a winding such that the voltage generated at the first winding is equal to zero. These shafts are moved alternately at an alternating rate which is much greater than the rate of change of the varying input voltage and thus the total displacement of either shaft is a function of the integral of this input varying voltage. In a second embodiment, differential and potentiometer components are employed in two feedback loops with two shafts wherein the rotation of one shaft moves the potentiometer arm to produce a voltage that is equal to the input varying voltage and then the other shaft moves this potentiometer arm to reduce the potentiometer arm output to zero. The shafts are alternately moved at an alternating rate which is quite high with respect to the rate of change of the input varying voltage and thereby the total displacement of either shaft is a function of the integral of the varying input voltage.

Obviously many modifications and variations of the present invention are possible in the light of the above teachings. It is therefore to be understood that within the scope of the appended claims the invention may be practiced otherwise than as specifically described.

What is claimed is:

1. An integrator for providing an indication of the integral of an input varying voltage, said integrator comprising: two input terminals to which the input varying voltage is applied; electro-mechanical transducing means comprising a synchro control transmitter and a synchro control receiver having first and second shaft inputs to said receiver and transmitter respectively for providing an output voltage at said receiver that is a function of the shaft displacement of both shafts; first driver means for driving said first shaft input; second driver means for driving said second shaft input; and switch means for alternately connecting the voltage applied at said two input terminals in series with the voltage provided at said receiver and applying the series voltage to the input of said first driver means, and for connecting the voltage provided by said receiver to the input of said second driver means.

2. The integrator of claim 1 wherein said switch means comprises a double-pole double-throw switch having an armature and means for alternately moving the armature from one switch position to the other for equal time intervals.

3. An integrator for providing an indication of the integral of an input varying voltage, said integrator comprising: two input terminals to which the input varying voltage is applied; electro-mechanical transducing means comprising a potentiometer and a differential, the shaft output of which controls the position of the arm of said potentiometer, said differential having first and second shaft inputs for providing an output voltage by said potentiometer that is a function of the shaft displacement of both input shafts; first driver means for driving said first shaft input; second driver means for driving said second shaft input; and switch means for alternately connecting the voltage applied at said two input terminals in series with the voltage provided by said potentiometer and applying the series voltages to the input of said first driver means, and for connecting the voltage provided by said potentiometer to the input of said second driver means.

4. The integrator of claim 3 wherein said switch means comprises: a double-pole double-throw switch having an armature and means for alternately moving the armature from one switch position to the other for equal time intervals.

5. An integrator for providing an indication of the integral of an input varying voltage, said integrator comprising: two input terminals, a synchro control receiver having stationary windings and a rotor winding, a lead for joining one of said input terminals to one end of said rotor winding, a switch having a first pair of contacts and a first arm for contacting said first pair of contacts and having a second pair of contacts and a second arm for contacting said second pair of contacts, an inverter connected between the other of said input terminals and one of said first pair of contacts, a lead joining the other of said first pair of contacts to said one end of said rotor winding, an amplifier having two input terminals, a lead for joining the other end of said rotor winding to one of said amplifier input terminals, a lead for joining said first arm to the other of said amplifier input terminals, a ground connection for one output of said amplifier, a lead joining the other output of said amplifier with said second arm, a first motor for driving the rotor of said synchro control receiver, a ground connection for one input to said first motor, a lead joining one of said second pair of contacts to the other input to said first motor, an armature interconnecting said first and second arms in a manner such that when said first arm is contacting said one of said first pair of contacts said second arm is contacting said one of said second pair of contacts, means for alternately moving said armature so that said arms alternately contact different contacts for equal periods of time, a synchro control transmitter having stationary windings and a rotor winding, leads interconnecting the stationary windings of said synchro control receiver and said synchro control transmitter, leads for joining said synchro control transmitter rotor winding to a source of A.C. voltage, a second motor for driving the rotor of said synchro control transmitter, a ground connection for one input of said second motor, a lead joining the other input of said second motor to the other of said second pair of contacts, and an indicator mounted to indicate the total rotor displacement of one of said rotors.

6. An integrator for providing an indication of the integral of an input varying voltage, said integrator comprising: two input terminals, a potentiometer circuit having a potentiometer arm, a lead for joining one of said input terminals to said potentiometer arm, a switch having a first pair of contacts with a first arm and having a second pair of contacts with a second arm, a lead joining the other of said input terminals to one of said first pair of contacts, a lead for joining said one input terminal to the other of said first pair of contacts, an amplifier having two input terminals, a lead for joining a point on the winding of said potentiometer to one of said amplifier input terminals, a lead for joining said first arm to the other of said amplifier input terminals, a ground connection for one output of said amplifier, a lead for joining the other output of said amplifier to said second arm, a differential having two shaft inputs and one shaft output, the one shaft output being connected to move said potentiometer arm, a first motor for driving one shaft input of said differential, a second motor for driving the other shaft input of said differential, an indicator mounted for indicating the total shaft displacement of one shaft input of said differential, a ground connection for one input to said first motor, a lead connecting one of said second pair of contacts to the other input of said first motor, an armature interconnecting said first and second switch arms such that when said first arm is contacting said one of said first pair of contacts said second arm is contacting said one of said second pair of contacts, means for alternately moving said armature so that said arms alternately contact different contacts for equal periods of time, a lead for joining the other of said second pair of contacts to an input of said second motor, and a ground connection for the other input to said second motor.

References Cited in the file of this patent
UNITED STATES PATENTS

| | | |
|---|---|---|
| 2,432,141 | Dehmel | Dec. 9, 1947 |
| 2,671,610 | Sweer | Mar. 9, 1954 |
| 2,733,391 | Mayer | Jan. 31, 1956 |
| 2,837,733 | Azgapetian | June 3, 1958 |

OTHER REFERENCES

Electronics Dictionary (Cooke and Markus), 1954, pages 149–150.